United States Patent
Ibendorf et al.

(10) Patent No.: US 10,627,526 B2
(45) Date of Patent: Apr. 21, 2020

(54) METHOD AND ASSEMBLY FOR DETERMINING POSITION

(71) Applicant: SIEMENS MOBILITY GMBH, Munich (DE)

(72) Inventors: Hendrik Ibendorf, Kleinmachnow (DE); Olaf Richter, Berlin (DE)

(73) Assignee: Siemens Mobility GmbH, Munich (DE)

(*) Notice: Subject to any disclaimer, the term of this patent is extended or adjusted under 35 U.S.C. 154(b) by 292 days.

(21) Appl. No.: 15/554,723

(22) PCT Filed: Feb. 22, 2016

(86) PCT No.: PCT/EP2016/053646
§ 371 (c)(1),
(2) Date: Aug. 31, 2017

(87) PCT Pub. No.: WO2016/142158
PCT Pub. Date: Sep. 15, 2016

(65) Prior Publication Data
US 2018/0239028 A1    Aug. 23, 2018

(30) Foreign Application Priority Data

Mar. 10, 2015  (DE) .................. 10 2015 204 259

(51) Int. Cl.
*G01S 19/22*  (2010.01)
*G01S 19/21*  (2010.01)
(Continued)

(52) U.S. Cl.
CPC ............ *G01S 19/22* (2013.01); *G01S 19/215* (2013.01); *G01S 19/36* (2013.01); *H01Q 21/205* (2013.01)

(58) Field of Classification Search
CPC ........ G01S 19/215; G01S 19/22; G01S 19/36; G01S 3/143; G01S 3/18; G01S 3/30; H01Q 21/205
See application file for complete search history.

(56) References Cited

U.S. PATENT DOCUMENTS 3,237,195 A * 2/1966 Schiffman ............ H01Q 21/205
                                                    342/464
5,923,287 A * 7/1999 Lennen ................... G01S 19/36
                                                    342/357.73
(Continued)

FOREIGN PATENT DOCUMENTS

DE       10213502 A1    12/2002
DE    202010016003 U1    6/2011
(Continued)

OTHER PUBLICATIONS

Gupta I. J., et al., "Non-Planar Adaptive Antenna Arrays for GPS Receivers", Oct. 2010, pp. 35-51, vol. 52.
(Continued)

*Primary Examiner* — Bernarr E Gregory
*Assistant Examiner* — Fred H Mull
(74) *Attorney, Agent, or Firm* — Laurence Greenberg; Werner Stemer; Ralph Locher

(57) ABSTRACT

A position is determined using GNSS (Global Navigation Satellite Systems) with an antenna assembly having a number of antennas that are oriented with different direction vectors. Antenna-received signals are supplied to an evaluation assembly, which includes GNSS receivers and an evaluation device. The antenna-received signals are detected with regard to their satellite-related signal-to-noise ratio and, in relation to each satellite, the satellite-specific signal-to-noise ratio measured values that are positively distinguished in their signal-to-noise ratio from other signal-to-noise ratio measured values relating to the same satellite are selected. A (Continued)

satellite-related main direction vector signal is formed from each of the direction vector signals of the antennas. The main direction vector signals are compared with the orientation vector signals that characterize the position of the respective satellites in orbit; in the event of minor deviations a position indication is given.

12 Claims, 3 Drawing Sheets

(51) Int. Cl.
*H01Q 21/20* (2006.01)
*G01S 19/36* (2010.01)

(56) References Cited

U.S. PATENT DOCUMENTS

| | | | |
|---|---|---|---|
| 6,088,653 A * | 7/2000 | Sheikh | G01S 19/36 |
| | | | 701/4 |
| 6,292,134 B1 * | 9/2001 | Bondyopadhyay | H01Q 21/205 |
| | | | 342/374 |
| 6,718,264 B2 | 4/2004 | Takahashi | |
| 6,784,831 B1 * | 8/2004 | Wang | G01S 19/36 |
| | | | 342/357.63 |
| 7,642,957 B2 | 1/2010 | Lennen et al. | |
| 7,764,224 B1 * | 7/2010 | Anderson | G01S 19/215 |
| | | | 342/357.27 |
| 2011/0287779 A1 * | 11/2011 | Harper | G01S 19/215 |
| | | | 455/456.1 |
| 2017/0285171 A1 * | 10/2017 | Ries | G01S 19/215 |

FOREIGN PATENT DOCUMENTS

| | | |
|---|---|---|
| EP | 2367026 A1 | 9/2011 |
| JP | 200724617 A | 2/2007 |

OTHER PUBLICATIONS

Brown Alison, "Performance and Jamming Test Results of a Digital Beamforming GPS Receiver", May 2002, pp. 1-11.

\* cited by examiner

METHOD AND ASSEMBLY FOR DETERMINING POSITION

BACKGROUND OF THE INVENTION

Field of the Invention

Use of global satellite navigation systems for location-finding, navigation and speed measurement is expected to increase in the field of rail transport. In this case, it can be difficult to ensure satisfactory accuracy of the calculated position (geographical data) due to reflections and shadowing of the high-frequency signals on buildings and rock faces and at tunnel entrances, bridges and railway stations, because these cause corrupted propagation times of the signals and therefore inaccuracies when determining position. These effects can result in the occurrence of errors in the calculated position, sometimes amounting to several hundred meters. The accuracy of the position calculated using such systems can also be adversely affected by fraudulent attacks, when falsified satellite signals are deliberately generated. The receivers of global navigation satellite systems then detect false measured values for calculating the position, without being able to recognize this locally.

In order to counter said fraudulent attacks, satellite navigation systems in the field of rail transport are provided with receivers to which pulse generators at the axles of the railcars of the respective rail vehicle are assigned for the purpose of validation. The speed and the distance covered can then be checked with reference to the pulse generators.

In addition to satellite navigation systems, use is also made of route section maps in order to validate the result obtained from the satellite receivers. The route for a train journey is set by the relevant switch tower, and the corresponding digital route section data of this specific route is transmitted to the train. It is therefore possible on the train to check whether the calculated position is situated in a defined corridor around the track.

In order to increase the accuracy when calculating the position of rail vehicles, provision is also made for attaching two antennas to the rail vehicle, these being mounted some meters apart. It is thereby possible to check whether the separation between these two antennas is also reflected in the calculated positions.

The accuracy when determining position can also be increased if a GNSS (Global Navigation Satellite System) receiver interacts with a plurality of different GNSS systems such as GPS and GLONASS, for example. Diversely redundant GNSS receivers using different GNSS systems reduce the susceptibility to failure.

A publication of the NAVSYS Corporation "Performance and Jamming Test Results of a Digital Beamforming GPS Receiver", May 2002, by Alison Brown also discloses a method for calculating the position, in which an antenna assembly comprising a plurality of antennas is used, said antennas being proximately disposed in parallel on a plane. A phase shifter with controller and a GNSS receiver are connected downstream of the antenna assembly. In this way, provision is made for relatively accurate position determining on the basis of so-called digital beamforming.

SUMMARY OF THE INVENTION

The invention relates generally to a method for determining position using GNSS (Global Navigation Satellite System) by means of an antenna assembly comprising a plurality of antennas and a received-signal evaluation assembly which is arranged downstream thereof, wherein said evaluation assembly contains both the GNSS receivers that are attached to the antennas and an evaluation device which is connected downstream of said GNSS receivers.

The object of the invention is to specify a method for determining position by means of satellites, whereby a particularly high level of reliability can be achieved with relatively low expenditure when determining the position.

In order to achieve this object, such a method makes use of an antenna assembly in which the antennas are oriented differently using various direction vectors; in relation to each detectable satellite, the antenna-received signals of all antennas are detected with regard to their satellite-related signal-to-noise ratio in each case, thus forming satellite-specific signal-to-noise ratio measured values, and from the satellite-specific signal-to-noise ratio measured values, in relation to each satellite, those satellite-specific signal-to-noise ratio measured values are selected which are positively distinguished in their signal-to-noise ratio from other signal-to-noise ratio measured values relating to the same satellite in each case; a satellite-related main direction vector signal is formed in each case from the direction vector signals of those antennas whose satellite-specific signal-to-noise ratio measured values were selected, and the satellite-related main direction vector signals are compared with orientation vector signals characterizing the position of the respective satellites in orbit; in the event of minor deviations a position indication is given.

It is considered an essential advantage of the inventive method that differing antenna-received signals are received as a result of the orientation of the antennas in various directions, and said signals when used in an evaluation according to the inventive method result in a position indication which is very dependable or reliable.

In the context of the inventive method, different types of antenna assemblies can be used and the quantity of antennas can also differ. It is important that the antennas are oriented differently according to various sides. The reliability of the calculated position increases with the quantity of antennas used.

With regard to the reliability that can be achieved when determining the position and with a view to an economical embodiment of the inventive method, it is considered advantageous to use an antenna assembly in which the antennas are placed as on the surfaces of a truncated pyramid. The term "truncated pyramid" here is used to graphically describe the spatial assembly of the antennas, though a corresponding supporting body for the antennas need not necessarily have such a format.

The quantity of the antennas on the respective surfaces of the truncated pyramid may differ. It is considered advantageous and generally adequate to use an antenna assembly comprising one antenna per surface of the truncated pyramid.

The truncated pyramid may be provided with different numbers of side surfaces. With a view to a low manufacturing cost of the antenna assembly, it is considered advantageous to use an antenna assembly in which the antennas are placed as on the surfaces of a truncated pyramid having a square base and on the top side.

In order to further increase the reliability when determining the position as per the inventive method, the output signals of the GNSS receivers are advantageously compared with further output signals from diversely redundant GNSS receivers which are connected in parallel with the GNSS receivers, and the generation of the respective main direction vector stops if there are differences between the first output signal and the further output signal. This prevents the occurrence of erroneous evaluations as a result of possible systematic errors of the GNSS receivers.

Different forms of evaluation device can be used in the context of the inventive method. A digital evaluation device in the form of a microcontroller is preferably used.

The invention further relates to an assembly for determining position using GNSS (Global Navigation Satellite System), with an antenna assembly comprising a plurality of antennas and a received-signal evaluation assembly which is arranged downstream thereof, said evaluation assembly being supplied with the antenna-received signals and containing both the GNSS receivers that are attached to the antennas and an evaluation device which is connected downstream of said GNSS receivers, the object of the invention being to develop such an assembly in an optimal manner in respect of reliability when determining position and in respect of manufacturing costs.

In order to achieve this object, the antenna assembly has antennas which are oriented in various directions, and the evaluation device is able, in relation to each detectable satellite, to detect the antenna-received signals of all antennas with regard to their satellite-related signal-to-noise ratio in each case, thus forming satellite-specific signal-to-noise ratio measured values, to select from the satellite-specific signal-to-noise ratio measured values, in relation to each satellite, those satellite-specific signal-to-noise ratio measured values which are positively distinguished in their signal-to-noise ratio from other signal-to-noise ratio measured values relating to the same satellite in each case, to form a satellite-related main direction vector signal in each case from the direction vector signals of the antennas whose satellite-specific signal-to-noise ratio measured values were selected, and to compare the satellite-related main direction vector signals with orientation vector signals characterizing the position of the respective satellites in orbit, and to give a position indication in the event of minor deviations.

The inventive assembly logically has the same advantages as those cited above in respect of the inventive method.

The antenna assembly in the inventive assembly may be designed in a very different manner, provided it is ensured that the antennas are oriented in different directions.

In an advantageous embodiment variant of the inventive assembly, as part of the antenna assembly, one antenna is placed on each of the surfaces of a truncated pyramid. In this case, the truncated pyramid can be formed by a body made of synthetic material, the antennas being situated on the surfaces thereof, i.e. on the side surfaces and the top surface of the truncated pyramid.

It is considered particularly advantageous for the antennas of the antenna assembly to be placed as on the surfaces of a truncated pyramid having a square base. This assembly has the advantage of being relatively easy to produce.

In order to further increase the accuracy and reliability when determining position, diversely redundant GNSS receivers are advantageously connected in parallel with the GNSS receivers, and comparators are connected downstream thereof, wherein said comparators stop the generation of the respective main direction vector signals if there are differences between an output signal of the first GNSS receiver and a further output signal of the diversely redundant GNSS receiver in each case.

The evaluation device in the inventive assembly may be designed in a different manner. It is considered particularly advantageous for the evaluation device to be a microcontroller.

BRIEF DESCRIPTION OF THE SEVERAL VIEWS OF THE DRAWING

For further clarification of the invention.

DESCRIPTION OF THE INVENTION

Figure 1:
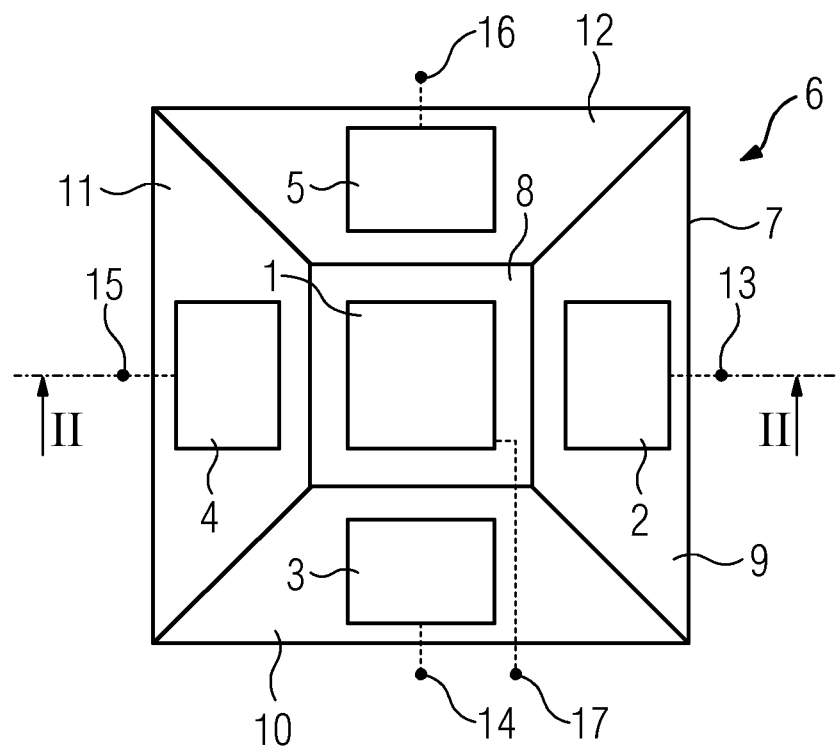
FIG. 1 shows a plan view of an exemplary embodiment of an antenna assembly of the inventive assembly.
Figure 2:
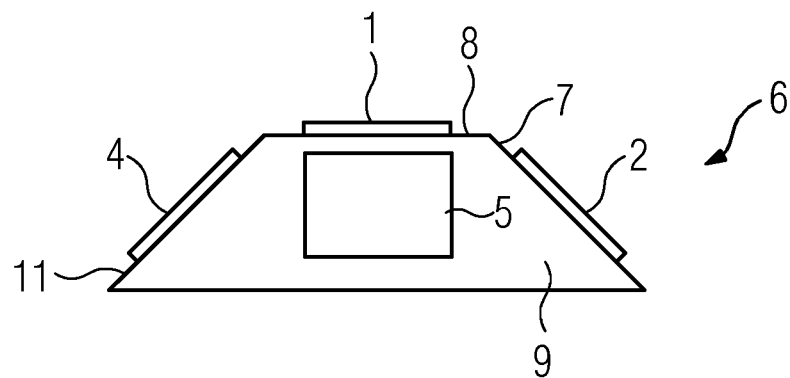
FIG. 2 shows a section through the antenna assembly according to FIG. 1 along the line I-I.

FIGS. 1 and 2 show antennas 1 to 5 of an antenna assembly 6, said antennas 1 to 5 being mounted on a supporting body 7 in the form of a truncated pyramid. In this case, the antenna 1 is placed on a top side 8 or top surface of the antenna assembly 6, while the antennas 2 to 5 are mounted on side surfaces 9, 10, 11 and 12.

Each of the antennas 2 to 5 is equipped with an external connection interface 13, 14, 15 and 16. A further external connection interface 17 leads to the antenna 1.

Figure 3:
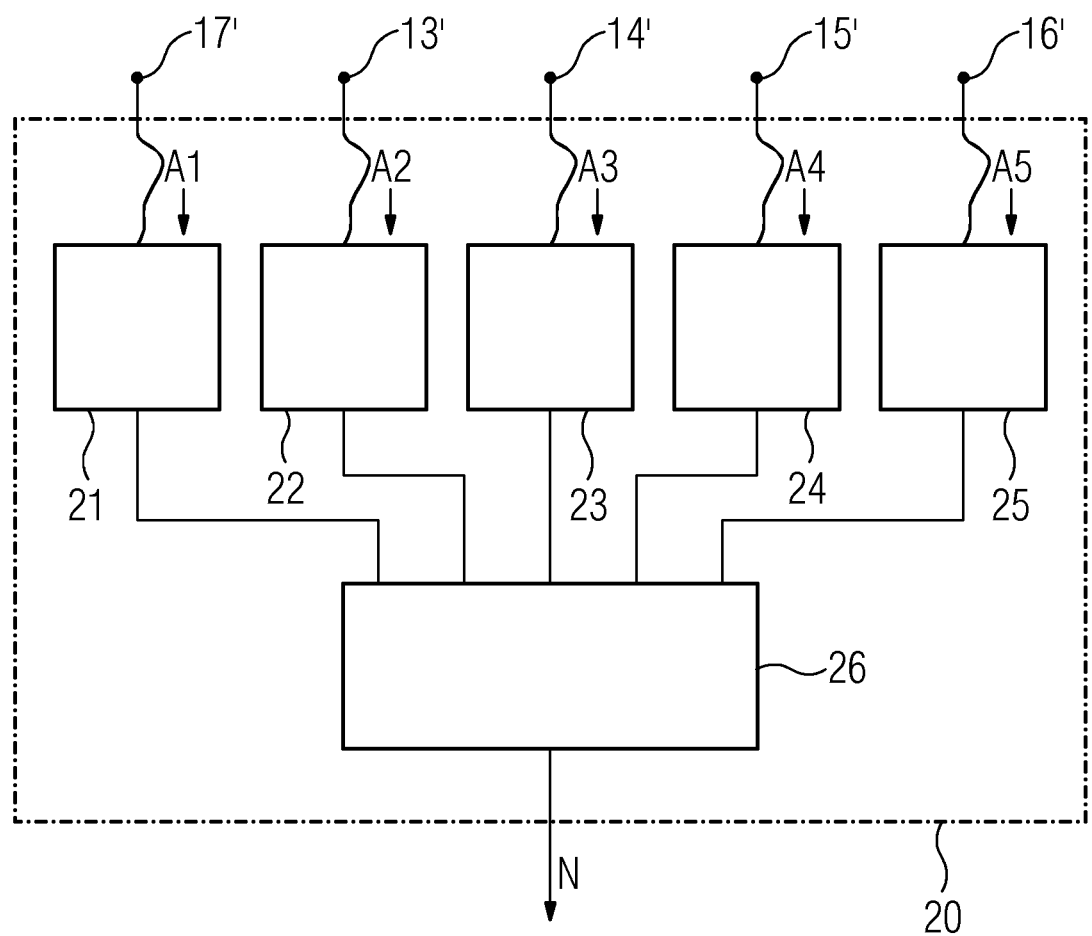
FIG. 3 shows an exemplary embodiment of an evaluation assembly with an evaluation device which is attached to GNSS receivers.

As shown in FIG. 3, an evaluation assembly 20 is equipped with external connection interfaces 17', 13', 14', 15' and 16', which can be connected to the corresponding connection interfaces 13 to 17 of the antenna assembly 6 (see also FIG. 1). The evaluation assembly 20 contains GNSS receivers 21, 22, 23, 24 and 25, these being connected on the input side to the corresponding antennas 1 to 5. Therefore antenna-received signals A1 to A5 are present at the inputs 17' to 16' of the GNSS receivers 21 to 25 and are evaluated in an evaluation device in the form of a microcontroller.

Figure 4:
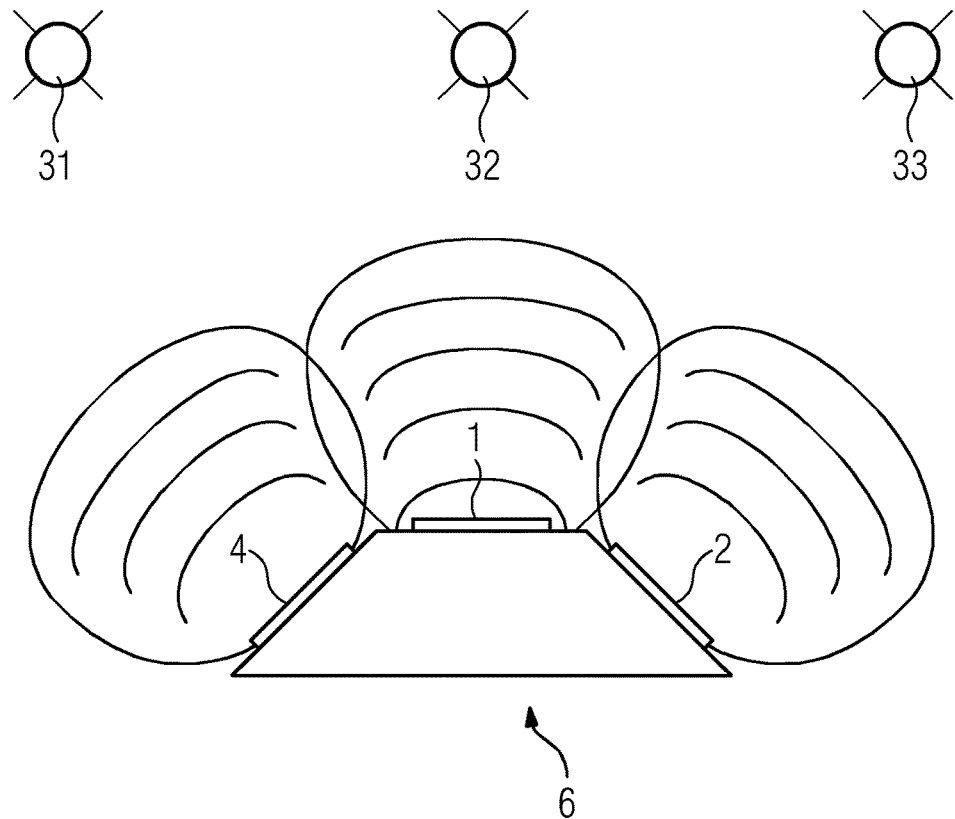
FIG. 4 shows a side view of an antenna assembly according to FIG. 2 in an application scenario with three detectable satellites.
Figure 5:
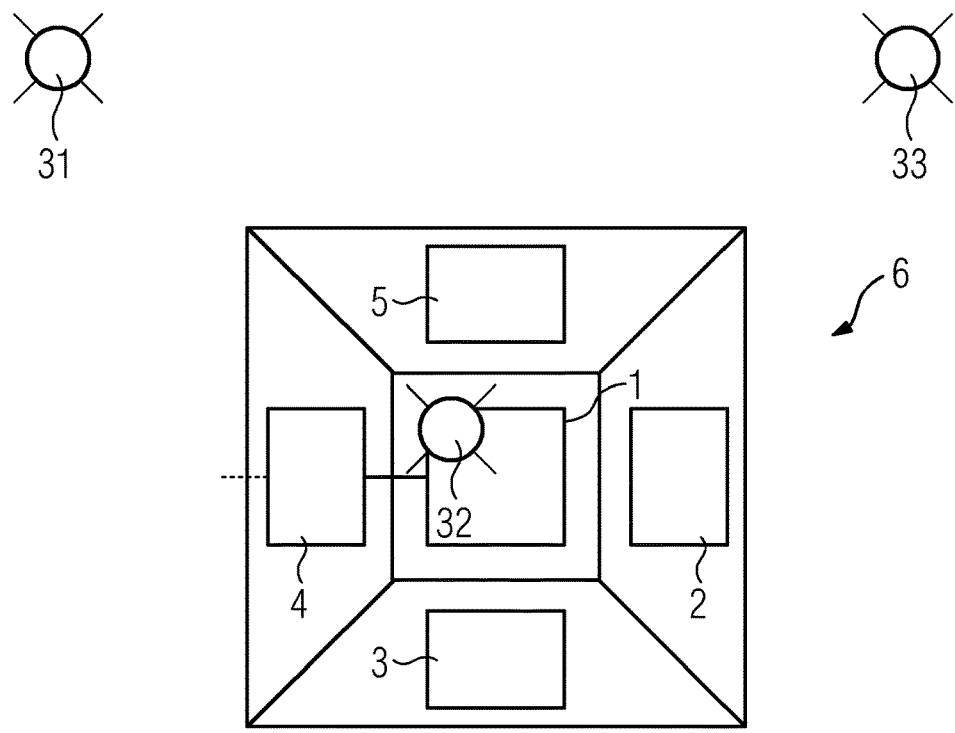
FIG. 5 shows a plan view of the illustration according to FIG. 4.

This evaluation initially provides for the respective signal-to-noise ratio SNR of the antenna-received signals A1 to A5 of the antennas 1 to 5 to be detected and/or measured in relation to each satellite. In the following table, exemplary measurement results are given for a configuration as shown in FIGS. 4 and 5, where satellites 31 to 33 are situated in the position shown there in relation to the antenna assembly 6.

|  | Satellite 31 | Satellite 32 | Satellite 33 |
| --- | --- | --- | --- |
| SNR at antenna 1 | 12 dB | 15 dB | 13 dB |
| SNR at antenna 2 | 3 dB | 10 dB | 12 dB |
| SNR at antenna 3 | 2 dB | 10 dB | 2 dB |
| SNR at antenna 4 | 12 dB | 12 dB | 3 dB |
| SNR at antenna 5 | 13 dB | 12 dB | 12 dB |
| Main direction vector | 1-4-5 | 1 | 1-2-5 |

The table shows that, with regard to the satellite 31, signals having a good signal-to-noise ratio SNR are only present at the antennas 1, 4 and 5, this being attributable to their favorable orientation to the satellite 31. The antennas 2 and 3 only receive very weak signals with an unfavorable signal-to-noise-ratio SNR from the satellite 31. Therefore only the (known) orientation vectors of the antennas 1, 4 and 5 are used in the evaluation device 26 for the purpose of forming a main direction vector. A corresponding main direction vector signal is formed by the evaluation device 26.

With regard to the satellite 32, it is evident from the table above that due to its relatively unfavorable orientation, it is not possible to detect a plurality of measured signals having a good signal-to-noise ratio in respect of this satellite, but only the antenna-received signal A2 of the antenna 1 because only this antenna-received signal A2 is positively distinguished from the other antenna-received signals. The main direction vector in this case coincides with the orientation vector of the antenna 1. It is not the same for the satellite 33, because a main direction vector is generated using the known orientation vectors of the antennas 1, 2 and 5 here. In effect, the antenna-received signals A1, A2 and A5 of the antennas 1, 2 and 5 here have a significantly better signal-to-noise ratio SNR than the antenna-received signals of the antennas 3 and 4.

In addition to the measured values for latitude and longitude, satellites also provide information about their position in orbit. This information is also supplied to the evaluation device 26. The evaluation device 26 can then compare the positions of the satellites 31 to 33 with the respective main direction vector, by comparing the respective main direction vector signal with a respective known orientation vector signal of the satellites 31 to 33, which is present according to the respective orientation vector. If the respective satellite-related main direction vector signal largely matches the corresponding orientation vector signal of the same satellite, a position indication takes place in that the evaluation device 26 outputs a navigation signal N containing the respective position data. The determination of the position is then complete.

Significant deviations of a determined main direction vector signal from the associated orientation vector signal or the coordinates in the orbit of the satellites signify that the corresponding satellite has been erroneously detected and therefore cannot be used for determining position. This may be caused by an interfering transmitter or reflections.

For the sake of better clarity, FIG. 3 does not show that a diversely redundant GNSS receiver can be connected in parallel with the GNSS receivers 21 to 25 in each case. Parallel-connected GNSS receivers in each case are then connected on the output side to a comparator (likewise not shown), which stops the output of a navigation signal if there are significant deviations between the output signals of both GNSS receivers due to a systematic error, said error being identified thereby.

The invention claimed is:

1. A method for determining position using GNSS (Global Navigation Satellite System) with a plurality of satellites, the method comprising:
   providing an antenna assembly having a plurality of antennas that are oriented differently, using various direction vectors, and a received-signal evaluation assembly downstream of the antenna assembly in a signal flow direction, the evaluation assembly containing a plurality of GNSS receivers connected to the antennas and an evaluation device;
   receiving signals from each detectable satellite of the GNSS satellites at each antenna of the plurality of antennas;
   determining a signal-to-noise ratio measured value for each satellite at each antenna based on the received signals;
   selecting from the signal-to-noise ratio measured values for each satellite, those signal-to-noise ratio measured values which are positively distinguished in their signal-to-noise ratio from other signal-to-noise ratio measured values relating to the same satellite;
   forming, for each satellite, a main direction vector from the direction vectors of those antennas whose signal-to-noise ratio measured values were selected; and
   comparing the main direction vectors with orientation vectors characterizing a position of the respective satellites in orbit in order to determine whether or not to provide a position indication representing a position of the antenna assembly.

2. The method according to claim 1, which comprises providing an antenna assembly having the antennas placed as on respective surfaces of a truncated pyramid.

3. The method according to claim 2, wherein the antenna assembly has one antenna on each surface of a truncated pyramid.

4. The method according to claim 2, wherein the truncated pyramid has a square base.

5. The method according to claim 1, which comprises comparing output signals of the GNSS receivers with further output signals from GNSS receivers of a different GNSS system that are connected in parallel with the GNSS receivers, and ceasing to generate the respective main direction vector if there are differences between the first output signal and the further output signal.

6. The method according to claim 1, wherein the evaluation device is a digital evaluation device in the form of a microcontroller.

7. An assembly for determining a position via a Global Navigation Satellite System (GNSS), the assembly comprising:
   an antenna assembly having a plurality of antennas and an signal evaluation assembly arranged downstream of said antennas in a signal flow direction and configured to receive antenna-received signals;
   said antennas of said antenna assembly being oriented differently with different direction vectors; and
   said evaluation assembly containing GNSS receivers connected to said antennas and an evaluation device connected downstream of said GNSS receivers in a signal flow direction;
   said evaluation device being configured:
   to receive signals from each detectable satellite of the GNSS satellites at each antenna of the plurality of antennas;
   to determine a signal-to-noise ratio measured value for each satellite at each antenna based on the received signals;
   to select, from the signal-to-noise ratio measured values for each satellite, those signal-to-noise ratio measured values which are positively distinguished in their signal-to-noise ratio from other signal-to-noise ratio measured values relating to the same satellite;
   to form, for each satellite, a main direction vector from the direction vector signals of those antennas whose signal-to-noise ratio measured values were selected; and
   to compare the main direction vectors with orientation vectors characterizing a position of the respective satellites in orbit in order to determine whether or not to provide a position indication representing a position of the antenna assembly.

8. The assembly according to claim 7, wherein said antennas are placed as on respective surfaces of a truncated pyramid.

9. The assembly according to claim 8, wherein said antenna assembly has one antenna on each surface of a truncated pyramid.

10. The assembly according to claim 9, wherein said truncated pyramid has a square base.

11. The assembly according to claim 7, which further comprises GNSS receivers of a different GNSS system connected in parallel with said GNSS receivers and comparators connected downstream thereof in each case, said comparators being configured to stop a generation of the respective main direction vector if there are differences between an output signal of the first GNSS receiver and a further output signal of the diversely redundant GNSS receiver in each case.

12. The assembly according to claim 7, wherein said evaluation device is a microcontroller.

* * * * *